United States Patent Office 3,444,130
Patented May 13, 1969

3,444,130
HYDROXYMETHYL DIPHENYL OXIDE-MODIFIED POLYESTER RESINS
Earl H. Rosenbrock, Auburn, and James D. Doedens, Midland, Mich., assignors to The Dow Chemical Company, Midland, Mich., a corporation of Delaware
No Drawing. Filed May 19, 1966, Ser. No. 551,202
Int. Cl. C08g *17/00, 17/14, 17/18*
U.S. Cl. 260—47
13 Claims

ABSTRACT OF THE DISCLOSURE

The present invention relates to novel compositions and methods in the polyester resin field. More particularly, this invention relates to polyester resins fortified through the use of hydroxymethyl diphenyl oxides to produce thermoset resins having desired flexibility, toughness, chemical resistance, and stability at elevated temperatures. The resin compositions of this invention are particularly useful as insulating materials for electrical conductors.

BACKGROUND OF THE INVENTION

Polyester resins prepared from aromatic dicarboxylic acids and dihydric alcohols are known in the art. The modification of such polyester resins with polyhydric alcohols and similar compounds is also well known. Methods for preparing such polyester resins are reviewed, for example by Bjorksten et al., Polyesters and Their Applications, Reinhold, New York (1956).

The electrical industry is constantly in search of new resin materials to be used as wire coatings, insulation varnishes, laminating resins, and the like, that can be used for constant operation at higher and higher temperatures. In particular the electrical industry is seeking insulating materials to perform in Class H service or higher. Such materials must, for example, be able to withstand constant temperatures of 180° C. or higher and temperatures greater than 200° C. for short intervals under overload conditions.

High temperature resistant resins in the above applications will allow for the construction of smaller and smaller electrical units such as motors, transformers, and the like, which will necessarily operate at higher temperatures. At the present time the only commercially-available resins that will fulfill these requirements are the silicones and the polyimides.

A wide variety of additions have been made to polyester resins in order to change their fundamental properties. There still remains today, however, a need for further improvement in the properties of these resins, particularly for use in the areas indicated above.

SUMMARY OF THE INVENTION

It has now been discovered that improved polyester resins may be prepared by incorporating a hydroxymethyl diphenyl oxide as a fortifying agent in polyester resins prepared from an aromatic dicarboxylic acid and a dihydric alcohol or a polyhydric alcohol having three or more hydroxyl groups and preferably from an aromatic dicarboxylic acid, a dihydric alcohol, and a polyhydric alcohol having three or more hydroxyl groups. The hydroxymethyl diphenyl oxide is added to the polyester in an amount of from about 5 to about 60 weight percent, polyester and hydroxymethyl diphenyl oxide basis. The resulting composition, either in the form of a mixture or a prepolymer, is cured in the presence of a transesterification catalyst at elevated temperatures, i.e., from about 150° C. to about 500° C.

While the precise reactions of the present invention are not fully known, it is believed that a transesterification reaction predominates. This is shown by the distillation of dihydric and polyhydric alcohols from the mixture as the reaction progresses. Some further polyesterification is also believed to occur, with cross linking through the polyol groups and methylene bridging.

As used herein, the term "aromatic dicarboxylic acid" refers to dicarboxylic acids wherein the carboxyl groups are linked directly to an aromatic nucleus or nuclei in such a way that, taking the shortest path through the carbon atoms of the nucleus, there are at least four nuclear carbon atoms in each nucleus between the carboxyl groups. In this definition a single benzene ring or a single naphthalene ring counts as one aromatic nucleus, while diphenyl ($C_6H_5 \cdot C_6H_5$) and diphenylalkane $$(C_6H_5 \cdot (CH_2)n \cdot C_6H_5)$$

count as two aromatic nuclei. Preferred dicarboxylic acids used to prepare polyesters which may be modified according to the present invention are those whose carboxyl groups are linked to the aromatic nuclei in diametrically opposite positions, i.e., in the para positions with a single benzene nucleus, in the 4,4'-positions with compounds containing two benzene nuclei, and in the 1,5 or 2,6 positions with compounds of the naphthalene series. Examples of such dicarboxylic acids include terephthalic acid, certain substituted terephthalic acids, such as diphenyl-4,4'-dicarboxylic acid, alpha, beta-diphenylethane-4,4'-dicarboxylic acid, alpha, delta-diphenylbutane-4,4'-dicarboxylic acid and other alpha, omega-diphenylalkane-4,4'-dicarboxylic acids, alpha, beta-diphenyloxyethane-4,4'-dicarboxylic acid, alpha, beta-diphenoxybutane-4,4'-dicarboxylic acid and other alpha, omega-diphenoxyalkane-4,4'-dicarboxylic acids, and the 1,5-, 2,6-, and 2,7-naphthalene dicarboxylic acids. The preferred dicarboxylic acid is terephthalic acid.

The polyhydric alcohols used to prepare the polyesters which are modified in the present invention include dihydric alcohols and alcohols having three or more hydroxyl groups. The term "polyhydric alcohol" is thus used herein to embrace both dihydric alcohols and alcohols having at least three hydroxyl groups. The dihydric alcohols used in the present invention include the glycols having the formula:

$$HOC_aH_{2a}OH$$

where $a$ is an integer from 2 to 10 inclusive. Included within the scope of this formula are the polymethylene glycols, such as ethylene glycol, trimethylene glycol, tetramethylene glycol, and the like, as well as branched chain glycols such as propylene glycol, neopentaglycol and the like. Other dihydric alcohols within the scope of the present invention include the ether alcohols, for example, diethylene glycol, triethylene glycol, dipropylene glycol, and the like. The preferred dihydric alcohol for the present invention is ethylene glycol.

The polyhydric alcohols containing at least three hydroxyl groups which are used to prepare polyesters modified in the present invention are those commonly employed in the synthesis of polyesters. Typical polyhydric alcohols of this class include, for example, glycerol, pentaerythritol, 1,1,1-trimethylolethane, 1,1,1,-trimethylolpropane, diglycerol, dipentaerythriotrol, sorbitol, and the like. The preferred polyhydric alcohol employed in the practice of this invention is glycerol.

The polyesters prepared from such aromatic dicarboxylic acids and at least one of such polyhdric alcohols preferably have a molecular weight between about 1000 and about 20,000.

Hydroxymethyl diphenyl oxides (hereinafter HMDPO) suitable for the practice of this invention can be prepared by hydrolyzing with caustic a halomethylated diphenyl oxide in the manner disclosed in U.S. Patent 3,100,796, issued Aug. 13, 1963. Isomers of HMDPO which are operable for this invention when used either singly or as mixtures include: dimethylol diphenyl oxide, trimethylol diphenyl oxide, and tetramethylol diphenyl oxide. Preferable are para, para'-dimethylol diphenyl oxide or a mixture of HMDPO's having the following range of mixed isomers:

| | Percent by weight |
|---|---|
| Monomethylol diphenyl oxide | 0–20 |
| Dimethylol diphenyl oxide | 64–76 |
| Trimethylol diphenyl oxide | 8–30 |
| Tetramethylol diphenyl oxide | 1–4 |

Catalysts suitable for this invention include either acidic or basic transesterification catalysts. Examples of such catalysts include zinc octoate, tetrabutyl titanate, zinc acetylacetonate, lead oxide, magnesium oxide, magnesium hydroxide, sodium ethylate, zinc stearate, antimony oxide, and p-toluenesulfonic acid. Preferably, the catalyst should be completely soluble in the reaction mixture in order to give a satisfactory insulating material. The preferred catalysts for this invention are zinc octoate, tetrabutyl titanate, and zinc acetylacetonate.

In practice, the novel thermosettable compositions of this invention are prepared by mixing the HMDPO with a polyester prepared from one or more aromatic dicarboxylic acids and one or more polyhydric alcohols. The mixing is preferably carried out in an inert solvent, i.e., a liquid in which the mixture is capable of forming at least a 5 weight percent homogeneous solution and which is non-reactive with the mixture under the conditions of reaction used herein. Such a mixture of HMDPO, polyester, and solvent may be applied to a surface to be coated and cured. Alternatively, the mixture may be heated, preferably for a time up to about 36 hours, at a temperature of from about 150° C. to about 300° C. to form a thermosettable prepolymer solution. The prepolymer solution is then applied to the surface to be coated and cured.

Suitable specific examples of inert solvents that may be used to prepare the thermosettable solutions of the present invention include the cylic aliphatic ketones, such as cyclopentanone, cyclohexanone, and the like; the glycol ethers, such as ethylene glycol methyl ether, ethylene glycol ethyl ether, ethylene glycol n-butyl ether, ethylene glycol phenyl ether, diethylene glycol methyl ether, diethylene glycol ethyl ether, diethylene glycol n-butyl ether, propylene glycol methyl ether, dipropylene glycol methyl ether, tripropylene glycol methyl ether; cresols, such as o-cresol, m-cresol, p-cresol; and alkylated toluenes; mixtures thereof; and the like. A mixture of solvents, such as cresylic acid (a mixture of phenols and cresols) or a mixture of a cyclic aliphatic ketone and a glycol ether, is preferred in order to give a spread in solvent boiling point while curing.

The resin solution, whether in the form of a physical mixture of HMDPO and polyester or as a prepolymer prepared as above, is used to make temperature- and chemical-resistant coatings, by heating at the curing temperature until a sufficient amount of curing has taken place to produce the cured resin coating. Curing temperatures of from about 150° C. to about 500° C. are advantageous in the practice of this invention. Curing temperatures less than about 150° C. result in unduly long curing times. Temperatures above about 500° C. cause decomposition of the polymeric resin as rapidly as it is formed. The preferred curing temperature range is from about 200° C. to about 450° C. The curing time depends on the use made of the resin. For wire coatings, a cure time of under thirty seconds will suffice. A coating of from 10 to 15 thousandths of an inch on an aluminum evaporating dish takes about fifteen minutes to cure.

From about 5 to about 60 weight percent, HMDPO and polymeric ester basis, of the HMDPO is desirable in producing the modified polyester resins of this invention. At least about 5 weight percent of the HMDPO is needed to give the desired thermal stability to the resin. Above about 60 weight percent of the HMDPO causes brittleness in the cured resin. Best results are obtained with from about 20 to about 40 weight percent HMDPO.

SPECIFIC EMBODIMENTS

The following examples describe completely representative specific embodiments of the invention claimed and the best modes contemplated by the inventors for practicing the claimed invention.

Example 1

A quantity of 325 g. of Multron R–38 polyester, identified as having a molecular weight of about 1500, and prepared by the reaction of terephthalic acid, glycerol, and ethylene glycol was mixed with 126.5 g. of a mixture of HMDPO having the specifications noted above, and prepared by hydrolyzing a commercial mixture of chloromethylated diphenyloxide with caustic. To this was added 5 g. of zinc octoate catalyst as a 20 percent by weight solution in cyclohexanone.

A quantity of 450 g. of cyclohexanone was added as a solvent. The reaction mixture was refluxed at about 152° to 160° C. for four hours. During this reaction time, ethylene glycol and glycerol were removed by distillation. After the above reaction, the residue was cooled and diluted to 30 percent by weight solids concentration with cyclohexanone.

A sufficient quantity of the above prepolymer polyester resin solution was added to an aluminum evaporating dish having a diameter of 2 inches so as to achieve a 1.0 g. quantity of cured resin in the evaporating dish. This corresponds to a coating of about 10 to 15 thousandths of an inch thickness. The evaporating dish was placed in an air circulating oven at 325° C. and cured for ten minutes. A flexible thermoset film resulted which adhered to the aluminum dish. The aluminum dish could be bent in all directions without cracking or chipping the coating. In some instances the aluminum cracked after continued bending, while the resin coating remained intact.

The dish and film were exposed to 200° C. for sixteen hours in a circulating hot air oven. After cooling and weighing, the coated dish had a 1.5 percent weight loss.

Samples of the cured resin were boiled for ten minutes in toluene and showed no attack. Complete evaporation of the removed toluene showed no polyester resin residue. The resin was boiled ten minutes in chloroform. The resin showed no signs of attack and the chloroform remained clear and colorless.

Samples of the cured resin were placed in a sealed glass ampule with a drop of water. The ampule was placed in a pressure vessel and heated to 125° C. for sixteen hours. After this treatment, the resin samples showed no signs of decomposition; some embrittlement was noted. Normally, under this test a polyester will hydrolyze to its original components.

Substitution of other polyesters having molecular weights between 1000 and 20,000 prepared from an aromatic dicarboxylic acid and at least one polyhydric alcohol in the above preparation gives a similar thermosettable polyester resin solution.

Example 2

A charge consisting of 250 g. of Multron R–38 polyester, 195 g. of a mixture of HMDPO as in Example 1, 8 g. of zinc octoate, 12 g. of tetrabutyl titanate and 400 g. of cyclohexanone was placed in a reaction vessel equipped with refluxing means and heated with stirring for 6 hours at a temperature between 180° and 190° C. Durnig the heating period, water and cyclohexanone were distilled off. At the conclusion of the heating period, the resulting prepolymer product was analyzed and found to contain 64.57 percent by weight solids. The solids content was cut back to 50 percent by weight by adding a quantity of 100 g. of cyclohexanone and 99 g. of ethylene glycol n-butyl ether. The 50 percent by weight prepolymer solution was heated for an additional 30 minutes at 225° C. The resulting composition contained 49.45 weight percent solids.

This prepolymer solution was added to a two-inch diameter aluminum evaporating dish in sufficient quantity to result in a 1 g. film on the dishes. After curing as in Example 1, the coated aluminum dish was placed in a forced air oven at 500° F. for 505 hours. The progressive weight loss of the sample was measured during this exposure test and is reported below in Table 1.

TABLE I.—PROGRESSIVE PERCENT WEIGHT LOSS OF POLYESTER-HMDPO RESIN DURING HEATING AT 500° F. FOR 505 HRS.

Hours:
| | |
|---|---|
| 24 | 5.1 |
| 48 | 6.6 |
| 145 | 11.3 |
| 192 | 15.5 |
| 240 | 18.6 |
| 336 | 22.4 |
| 409 | 24.6 |
| 505 | 27.1 |

Example 3

A prepolymer solution prepared as in Example 2 was used to coat No. 18 copper magnet wire continuously on a laboratory wire coating machine similar in design to commercially used magnet wire coaters. The coated wire was evaluated by the mandrel test and the General Electric abrasion scrape test.

In the mandrel test, the coated wire is stretched from about 5 to about 25 percent on a wire stretching machine and wrapped around decreasing mandrel sizes on the machine, starting with ten times the wire diameter. The elongation given is the maximum to pass the mandrel equal in size to the wire diameter without cracking or popping. The General Electric abrasion scrape test involves passing a 0.016 inch diameter needle under a 700 g. load on a piece of coated wire through which an electrical current is passed. The needle is alowed to scrape on the coating until it breaks through, shorting out the wire. The value is essentially equal to the number of passes the needle makes. The results reported are an average of five runs.

The prepolymer solution was run on the wire coating machine with the curing tower at 450° C. at a speed of 15 feet/minute for six coatings. Final coated wire diameter was 0.0445 inch. The coated wire passed a mandrel equal in size to the wire diameter at 10 percent elongation and had a General Electric abrasion scrape value of 22. When the speed of the wire through the curing tower was increased to 18 feet per minute, the final coated wire diameter was 0.0440 inch. Such wire passed the mandrel equal in size to the wire diameter at 15 percent elongation and had a General Electric abrasion scrape value of 17. With a wire speed through the curing tower of 20 feet per minute for six coatings the final wire diameter was 0.0438 inch. Such wire passed the mandrel equal in size to the wire diameter at 20 percent elongation and had a General Electric abrasion scrape value of 16.

Example 4

A quantity of 250 g. of Multron R-38 polyester, 200 g. of the mixture of HMDPO used in Examples 1 and 2, 20 g. of a 5 percent by weight solution of zinc acetylacetonate, and 400 g. of cyclohexanone was heated for one hour at a temperature of 180° C. as in Example 2. The resulting composition was used to coat wire on a wire coating machine as in Example 3. At a curing tower temperature of 450° C. and a wire speed of 15 feet per minute through the tower, the coated wire passed a mandrel equal to the wire diameter at 15 percent elongation and had a General Electric abrasion scrape value of 50.

The above examples show that, when fortified with HMDPO, polyesters prepared from an aromatic dicarboxylic acid and at least one polyhydric alcohol may be used to prepare coatings having a sizable degree of thermal stability improvement while having flexibility and toughness comparable to coatings prepared from commercially-available polyesters.

We claim:

1. A thermosettable hydroxymethyl diphenyl oxide-modified resinous polyester composition comprising:
    (a) about 5 to about 60 percent by weight, based on the combined weights of (a) and (b), of a hydroxymethyl diphenyl oxide which is at least one of mono-, di-, tri- or tetra-(hydroxymethyl)diphenyl oxide, and the mono-substituted isomer is present in amounts not greater than about 20 percent by weight of the total hydroxymethyl diphenyl oxide, and
    (b) about 40 to about 95 percent by weight, based on the combined weights of (a) and (b), of the resinous polyester of an aromatic dicarboxylic acid and one or more polyhydric alcohols, and said polyester molecular weight is between about 1,000 and about 20,000.

2. The process of curing the polyester composition of claim 1 comprising heating the composition at a temperature between about 150° and 500° C. in the presence of a transesterification catalyst.

3. An insulated electrical conductor comprising an electrical conductor coated with the polyester composition defined in claim 1.

4. The insulated electrical conductor defined in claim 3, the coating of which has been cured by heating at a temperature between about 150° C. and about 500° C. in the presence of a catalyst.

5. The insulated electrical conductor defined in claim 4 wherein the aromatic dicarboxylic acid is terephthalic acid, the dihydric alcohol is ethylene glycol, the polyhydric alcohol is glycerol, the hydroxymethyl diphenyl oxide is present in an amount of from about 20 to about 40 percent by weight, the catalyst is zinc octoate, tetrabutyl titanate or zinc acetylacetonate and the cure temperature is between about 200° C. and about 450° C.

6. A thermosettable resinous composition as in claim 1 wherein said resinous ester is that of an aromatic dicarboxylic acid and a dihydric alcohol and a polyhydric alcohol having at least three hydroxyl groups.

7. A thermosettable resinous composition as in claim 6 wherein the resinous ester is that of terephthalic acid, and ethylene glycol and with glyceral, and said hydroxymethyl diphenyl oxide is present in an amount of from about 20 to about 40 weight percent.

8. A thermosettable resinous composition as in claim 1 wherein said hydroxymethyl diphenyl oxide is a mixture containing from about 9 to about 35 percent by weight of hydroxymethyl diphenyl oxide having three or more methylol groups per molecule.

9. A thermosettable resinous composition as in claim 1 wherein said hydroxymethyl diphenyl oxide is present in an amount of from about 20 to about 40 weight percent and is a mixture containing from about 9 to about 35 percent by weight of hydroxymethyl diphenyl oxide having three or more methylol groups per molecule, and said polymeric ester is that of terephthalic acid with ethylene glycol and with glycerol.

10. The process of claim 2 wherein said polymeric ester is that of an aromatic dicarboxylic acid, a dihydric alcohol, and a polyhydric alcohol having at least three hydroxyl groups.

11. The process of claim 10 wherein said aromatic dicarboxylic acid is terephthalic acid, said dihydric alcohol is ethylene glycol, said polyhydric alcohol is glyceral, said hydroxymethyl diphenyl oxide is present in an amount of from about 20 to about 40 weight percent, said catalyst is selected from the group consisting of zinc octoate, tetrabutyl, titanate, and zinc acetylacetonate, and said polyester is cured at a temperature of from about 200 to about 450° C.

12. A cured polyester resin prepared in accordance with the process of claim 11.

13. A cured polyester resin prepared in accordance with the process of claim 2.

References Cited

UNITED STATES PATENTS

| | | |
|---|---|---|
| 3,100,796 | 8/1963 | Trapp et al. |
| 3,177,180 | 4/1965 | Doedens et al. |
| 3,269,973 | 8/1966 | Doedens et al. _____ 260—47 |

FOREIGN PATENTS

| | | |
|---|---|---|
| 835,823 | 5/1960 | Great Britain. |
| 984,884 | 3/1965 | Great Britain. |

WILLIAM H. SHORT, *Primary Examiner.*

L. P. QUAST, *Assistant Examiner.*

U.S. Cl. X.R.

117—128.4, 132; 260—32.8, 33.2, 33.4, 33.6, 75